(12) United States Patent
Guleryuz

(10) Patent No.: US 7,260,269 B2
(45) Date of Patent: Aug. 21, 2007

(54) IMAGE RECOVERY USING THRESHOLDING AND DIRECT LINEAR SOLVERS

(75) Inventor: Onur G. Guleryuz, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 825 days.

(21) Appl. No.: 10/646,248

(22) Filed: Aug. 22, 2003

(65) Prior Publication Data

US 2004/0109613 A1 Jun. 10, 2004

Related U.S. Application Data

(63) Continuation-in-part of application No. 10/229,667, filed on Aug. 28, 2002, now Pat. No. 7,120,308.

(60) Provisional application No. 60/440,824, filed on Jan. 16, 2003.

(51) Int. Cl.
*G06K 9/40* (2006.01)
*H04N 7/12* (2006.01)

(52) U.S. Cl. ............... 382/274; 382/276; 375/240.18

(58) Field of Classification Search ............ 382/232, 382/236, 240, 254, 274, 275, 276, 279, 300; 375/240.18, 240.19, 240.2, 240.27, 254, 375/286

See application file for complete search history.

(56) References Cited

U.S. PATENT DOCUMENTS

| 5,081,690 A | 1/1992 | Tan |
| 5,751,361 A | 5/1998 | Kim |
| 5,841,477 A | 11/1998 | Kim |
| 5,912,707 A | 6/1999 | Kim |
| 5,936,674 A | 8/1999 | Kim |
| 6,070,133 A * | 5/2000 | Brewster et al. ............... 704/9 |
| 6,141,448 A * | 10/2000 | Khansari et al. ............ 382/236 |
| 6,163,868 A | 12/2000 | Kondo et al. |

(Continued)

FOREIGN PATENT DOCUMENTS

| WO | WO 02/096118 | 11/2002 |
| WO | WO02096118 | 11/2002 |

OTHER PUBLICATIONS

"Translation-Invariant De-Noising", R.R. Coifman and D.L. Donoho, Yale University and Stanford University, pp. 1-26, 1995.

(Continued)

*Primary Examiner*—Kanjibhai Patel

(57) ABSTRACT

An image recovery algorithm that recovers completely lost blocks in an image/video frame using spatial information surrounding these blocks. One application focuses on lost regions of pixels containing textures, edges and other image features that pose problems for other recovery and error concealment algorithms. The algorithm is designed to be applied once on each of n layers and does not require any complex preconditioning, segmentation, or edge detection steps. The layers are filled with an initial value and a threshold is set. One layer at a time, overcomplete transforms are evaluated over that layer, and transform coefficients are selectively thresholded to determine a set of transform coefficients that have absolute values below the threshold. A system of linear equations is constructed from which the missing data elements in that layer are determined. Utilizing locally sparse linear transforms in an overcomplete fashion, good PSNR performance is obtained in the recovery of such regions.

30 Claims, 5 Drawing Sheets

U.S. PATENT DOCUMENTS

| | | | |
|---|---|---|---|
| 6,263,108 B1 | 7/2001 | Kondo et al. | |
| 6,311,297 B1 | 10/2001 | Kondo et al. | |
| 6,369,749 B1* | 4/2002 | Frey, Jr. | 342/93 |
| 6,377,280 B1 | 4/2002 | Acharya et al. | |
| 6,496,604 B1 | 12/2002 | Bricourt | |
| 6,549,674 B1 | 4/2003 | Chui et al. | |
| 6,587,592 B2 | 7/2003 | Georgiev et al. | |
| 6,594,391 B1* | 7/2003 | Quadranti et al. | 382/203 |
| 6,611,561 B1* | 8/2003 | Hannuksela et al. | 375/240.27 |
| 6,611,627 B1 | 8/2003 | LaRossa et al. | |
| 6,636,565 B1* | 10/2003 | Kim | 375/240.27 |
| 6,643,406 B1 | 11/2003 | Hajjahmad et al. | |
| 6,768,495 B2* | 7/2004 | Valente | 345/619 |
| 6,862,366 B2 | 3/2005 | Bhattacharjya | |
| 7,068,851 B1* | 6/2006 | Berkner | 382/261 |
| 2003/0086623 A1 | 5/2003 | Berkner et al. | |

OTHER PUBLICATIONS

"Ideal Spatial Adaptation by Wavelet Shrinkage", David L. Donoho, Iain M. Johnstone, Dept. of Statistics, Stanford University, Stanford CA, Jun. 1992, Revised Apr. 1993, pp. 1-30.

"Error Resilient Video Coding Techniques", Real-Time Video Communications over Unreliable Networks, Yao Wang, et al., IEEE Signal Processing Magazine, Jul. 2000, pp. 61-82.

"A Dual-Tree Complex Wavelet Transform with Improved Orthogonality and Symmetry Properties", Nick Kingsbury, Signal Processing Group, Dept. of Engineering, University of Cambridge, Cambridge UK, Sep. 11, 2000.

"On the Importance of Combining Wavelet-Based Nonlinear Approximation with Coding Strategies", Albert Cohen, et al., IEEE Transactions on Information Theory, vol. 48, No. 7, Jul. 2002, pp. 1895-1921.

"Concealment of Damaged Block Transform Coded Images Using Projections onto Convex Sets", Huifang Sun, et al., IEEE Transactions on Image Processing, vol. 4, No. 4, Apr. 1995, pp. 470-477.

"Spatially Adaptive Image Denoising Under Overcomplete Expansion", Xin Li and Michael T. Orchard, Department of Electrical Engineering, Princeton University, IEEE 2000, pp.300-303.

Spatially Adaptive Wavelet Thresholding with Context Modeling for Image Denoising, S. Grace Chang, et al., IEEE Transactions on Image Processing, vol. 9, No. 9, Sep. 2000, pp. 1522-1531.

"Error Control and Concealment for Video Communication: A Review", Yao Wang and Qin-Fan Zhu, Proceedings of the IEEE, vol. 86, No. 5, May 1998, pp. 974-997.

"De-Noising by Soft-Thresholding", David L. Donoho, IEEE Transactions on Information Theory, vol. 41, No. 3, May 1995, pp. 613-627.

"Analysis of Multiresolution Image Denoising Schemes Using Generalized Gaussian and Complexity Priors", Pierre Moulin and Juan Liu, IEEE Transactions of Information Theory, vol. 45, No. 3, Apr. 1999, pp. 909-919.

"Interpolation of Missing Data in Image Sequences", Anil C. Kokaram, et al., IEEE Transactions of Image Processing, vol. 4, No. 11, Nov. 1995, pp. 1509-1519.

"Information Loss Recovery for Block-Based Image Coding Techniques-A Fuzzy Logic Approach", Xiaobing Lee, et al., IEEE Transactions on Image Processing, vol. 4, No. 3, Mar. 1995, pp. 259-273.

"DCT Coefficients Recovery-Based Error Concealment Technique and Its Application to the MPEG-2 Bit Stream Error", Jong Wook Park, et al., IEEE Transactions on Circuits and Systems for Video Technology, vol. 7, No. 6, Dec. 1997, pp. 845-854.

"A Parametric Texture Model Based on Joint Statistics of Complex Wavelet Coefficients", Javier Portilla and Eero P. Simoncelli, Center for Neural Science, and Courant Institute of Mathematical Sciences, New York University, New York, NY, International Journal of Computer Vision 40(1), pp. 49-71, 2000.

"Filling-In by Joint Interpolation of Vector Fields and Gray Levels", Coloma Ballester, et al. IEEE Transactions on Image Processing, vol. 10, No. 8, Aug. 2001, pp. 1200-1211.

"Nonlinear approximation", Ronald A. DeVore, Department of Mathematics, University of South Carolina, Columbia, SC, Cambridge University Press, 1998, pp. 51-150.

"Errorless Restoration Algorithms for Band-Limited Images", Paulo Jorge S. G. Ferreira and Armando J. Pinho, IEEE, 1994, pp. 157-161.

Transform Coded Image Reconstruction Exploiting Interblock Correlation, Sheila S. Hemami and Teresa H.-Y. Meng, IEEE Transactions on Image Processing, vol. 4, No. 7, Jul. 1995, pp. 1023-1027.

"Combining Frequency and Spatial Domain Information for Fast Interactive Image Noise Removal", Anil N. Hirani, Takashi Totsuka, Sony Corporation, 1996.

"Reconstruction of Baseline JPEG Coded Images in Error Prone Environments", Shahram Shirani, et al., IEEE Transactions on Image Processing, vol. 9, No. 7, Jul. 2000, pp. 1292-1299.

"Fast DCT-Based Spatial Domain Interpolation of Blocks in Images", Ziad Alkachouh and Maurice G. Bellanger, IEEE Transactions on Image Processing, vol. 9, No. 4, Apr. 2000, pp. 729-732.

* cited by examiner

IMAGE RECOVERY USING THRESHOLDING AND DIRECT LINEAR SOLVERS

CONTINUING APPLICATION DATA

This application claims the benefit under 35 U.S.C. §119 (e) of U.S. Provisional Application No. 60/440,824, filed Jan. 16, 2003.

This application also claims the benefit under 35 U.S.C. §120 as a continuation-in-part of application Ser. No. 10/229,667, filed on Aug. 28, 2002 now U.S. Pat. No. 7,120,308, and entitled "Iterated De-Noising for Image Recovery." The content of this parent application is incorporated by reference herein.

BACKGROUND OF THE INVENTION

1. Field of the Invention

The present invention relates to improved algorithms for recovering missing data in a digital signal, and more specifically for predicting lost regions of data in the signal using information surrounding these regions. The algorithms are primarily directed to recovering an image/video-frame by predicting lost regions of pixels in the image/video-frame using spatial information surrounding these regions. The techniques of the algorithms may be embodied in software, hardware or combination thereof and may be implemented on a computer or other processor-controlled device.

2. Description of the Related Art

In many image and video compression applications the decoder frequently has to contend with channel corrupted data and therefore has to resort to image recovery and error concealment algorithms. Throughout the years, many techniques have been proposed that enable decoders to avoid the severe consequences of channel errors. In the case of images, the lost or erroneous data has to be predicted spatially, while for video both temporal and spatial prediction can be attempted. However, previous techniques suffer from various problems, including too many prediction errors, too application, procedure or data coordinate specific operation, able to handle only certain regions of specific size, shape and/or type of data, limited robustness and/or adaptability, and requiring special information such as motion vectors for video frames.

Above-identified application Ser. No. 10/229,667 (the related application) provides algorithms that can recover an image/video-frame by predicting lost regions of pixels in the image/video-frame using spatial information surrounding these regions. The algorithms predict the lost regions of pixels using denoising with thresholding, preferably iterative denoising with hard thresholding. This invention provides improved data recovery algorithms.

OBJECT AND SUMMARY OF THE INVENTION

Object of the Invention

It is therefore an object of the present invention to provide an image recovery technique and algorithm that predicts missing regions of data in a digital signal using spatial information surrounding these regions but without requiring iterations.

Summary of the Invention

According to one aspect of this invention, a method for recovering missing data in a digital signal is provided. The method comprises the steps of: (a) grouping non-missing data elements in at least one region in which at least some data is missing into n layers, where n is an integer greater than or equal to 1; and (b) assigning an initial value to each missing data element in the at least one region. For each of the n layers the following operations are performed, preferably only once: (c)(1) evaluating a plurality of orthogonal transforms over layer n, (c)(2) thresholding, preferably hard-thresholding, select transform coefficients in layer n using a threshold to determine a set of transform coefficients that have absolute values below the threshold, (c)(3) constructing a selection matrix using the set of transform coefficients determined in (c)(2), (c)(4) constructing a system of linear equations based on the selection matrix constructed in (c)(3), and (c)(5) solving the system of linear equations constructed in (c)(4) to solve for the missing data elements in layer n.

The at least one region in which at least some data is missing may contain at least one of an edge or a texture feature.

In one embodiment, the digital signal is an image or video frame comprised of a plurality of pixels and the at least one region in which at least some data is missing comprises at least some pixels that are missing. All of the pixels from the at least one region may be missing.

The plurality of orthogonal transforms may comprise a discrete cosine transform (DCT) and a predetermined number of its overcomplete shifts, a wavelet transform and a predetermined number of its overcomplete shifts, or a Fourier transform and a predetermined number of its overcomplete shifts. In a preferred embodiment, the DCT transform is used in connection with an image or video signal. A wavelet or Fourier transform may also be used for such signals. For other types of signals (e.g., non-image or non-video signals), a particular transform may provide better results than others, depending on the particular signal. One should utilize transforms that are expected to provide sparse representations on the type of data being processed. Selecting the appropriate transform in such cases will be apparent to one skilled in the art based on the teachings provided herein.

According to another aspect of the invention, a method for recovering missing data in a digital signal, comprises the steps of adaptively determining a selection matrix for each of n layers of a region in which at least some data is missing, n being an integer greater than or equal to 1; constructing a system of linear equations based on each selection matrix; and solving each constructed system of linear equations to solve for the missing data in the corresponding layer n. In this aspect, a selection matrix is adaptively determined based on the image and information in an area surrounding the region in which at least some data is missing. The selection matrix may be thus determined directly or determined from a set of transform coefficients that have absolute values below a threshold that are first adaptively determined from the image and an area surround the missing data region.

In other aspects, the invention involves an apparatus including one or more components for performing the processing operations described above in connection with either or both of the methods. Such components may include, for example, a general microprocessor, or one or more application specific integrated circuits (ASICs), digital signal processing circuitry, etc., or a combination thereof.

In accordance with further aspects of the invention, any of the above-described methods or steps thereof may be embodied in a program of instructions (e.g., software) which may be stored on, or conveyed to, a computer or other processor-controlled device for execution. Alternatively, the program of instructions may be integrated with hardware designed to perform one or more of the steps (e.g., one or more ASICs, digital signal processing circuitry, etc.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

A. Overview

In patent application Ser. No. 10/229,667 (related application), algorithms were presented that predict data in regions from which data is missing using iterated denoising with thresholding, e.g., hard-thresholding. The invention of this application provides improved image recovery algorithms that do not require iterations.

As was the case with the algorithms of the related application, the image/video-frame recovery algorithms of the present invention are primarily concerned with the recovery of lost data using spatial prediction alone. As such, for video, the techniques of the algorithms are directly applicable in cases in which temporal prediction is either not possible or not prudent, for example, in cases involving severely corrupted motion vectors and/or intra-marked macroblocks in the popular MPEG algorithms. While the algorithms of the present invention are primarily concerned with the recovery of completely lost image/video-frame blocks, the algorithms are not so limited. Rather, the algorithms can be adapted to situations in which partial information is available and the lost data corresponds to non-rectangular or irregularly shaped regions. The algorithms are particularly useful for robust recovery of image/video-frame blocks that contain textures, edges, and other features that pose problems for current methods. While the algorithms take into consideration the importance of visual appearance and uniformity, the algorithms are also adapted to achieve significant peak signal-to-noise ratio (PSNR)

$$\left(10 \times \log_{10}\left(\frac{255 \times 255}{meansquarederror}\right)\right)$$ improvements in recovered regions.

Figure 1:
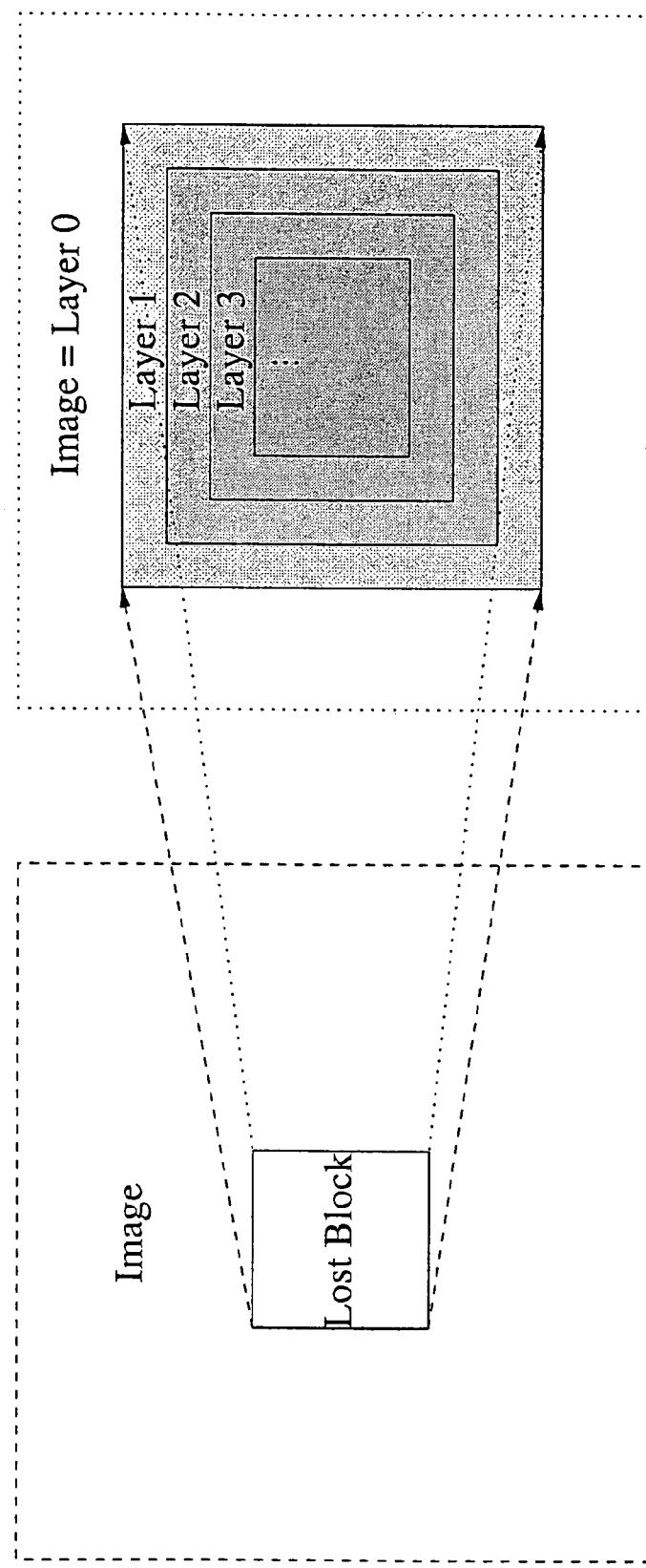
FIG. 1 is a schematic illustration of layers of pixels in the recovery process, where each layer is recovered using the preceding layers surrounding it.

Similar to the algorithms of the related application, the new algorithms provided herein start by grouping the missing pixels into layers as shown in FIG. 1. Briefly, the algorithms of the related application iteratively recovered the missing pixels in these layers. Upon filling the layers with an initial value, the related application's algorithms select a threshold and evaluate several overcomplete transforms over the layers. The transform coefficients are selectively hard-thresholded and inverse transformed to recover layer 1 pixels while keeping the pixels in the other layers unaltered. Given L layers, this operation is repeated L times to recover all of the layers. After that, the related application's algorithms reduce the utilized threshold by a specific amount and proceed with the same computations for layer recovery starting with layer 1 again. The related application's algorithms terminate when the reduced threshold reaches a predetermined level.

The algorithms provided herein are motivated by the fact that most of the recovery performance in the related application's algorithms typically come from the initial iterations. Thus, in the present invention an initial thresholding decision is used to fix the set of transform coefficients that are thresholded to zero, but unlike in the related application's algorithms which recomputed and change this set at each iteration, this set is kept fixed for each layer. This results in significant savings in computation, since the iterative solution of the related application's algorithms is now reduced to a system of linear equations which can be solved directly, i.e., each layer is recovered in a single step without the need for iterations.

Hard-thresholding a coefficient c yields 0 if $|c|<T$, and leaves the coefficient unchanged otherwise. Similar to the related application, the role of the utilized transformations is very important. Indeed, the underlying operational basis of the algorithms of this invention is sparse image representations with the utilized linear transforms. The details of the algorithms and other details pertinent to the invention are described below.

B. Main Derivation

Initially, the denoising using a hard-thresholding operation is written in mathematical notation to see that iterations reduce to the solution of a system of linear equations in the case where selective thresholding decisions are made at the outset of layer recovery, i.e., when selective thresholding decisions are not allowed to vary with each iteration during the recovery of each layer.

Arrange the image to be recovered into a vector $x(N \times 1)$ such that $$x = \begin{bmatrix} x_0 \\ x_1 \\ x_2 \\ \vdots \\ x_L \end{bmatrix} \quad (1)$$

where $x_0$ constitutes the available pixels (layer 0), $x_1$ through $x_L$ are the pixels in layers 1 through L, and it is understood that the number of components in $x_i$, denoted $n_i$, indicates the number of pixels in layer i. Thus, $$\sum_{i=0}^{L} n_i = N.$$

Let $H_1, H_2, \ldots, H_M$ (N×N) denote the overcomplete set of transformations utilized in the denoising, i.e., each of the $H_i$ corresponds to a complete transform over the entire image x. Let $$G = \begin{bmatrix} H_1 \\ H_2 \\ \vdots \\ H_M \end{bmatrix} (MN \times N) \quad (2)$$

denote the compound transformation and $$\tilde{G} = [H_1^{-1} H_2^{-1} \ldots H_M^{-1}](N \times MN) \quad (3)$$

denote the "inverse" overcomplete transform. Note that Gx results in a MN×1 vector which contains MN transform coefficients, i.e., N coefficients for each transform; thus, $$x = \frac{1}{M} \tilde{G} G x.$$

"Selection matrix" is defined as follows. Denoising x with a given overcomplete set of transforms will yield a vector y given by $$y = \frac{1}{M} \tilde{G} S G x \quad (4)$$

where S (MN×MN) is a diagonal selection matrix of zeros and ones. The diagonal elements indicate which coefficients are kept (diagonal element=1) and which coefficients are hard-thresholded to zero (diagonal element=0).

Observe that the set of coefficients which will be hard-thresholded to zero are determined by evaluating the various transforms and comparing the absolute values of the transform coefficients to a given threshold. If the absolute value is less than the threshold, then the corresponding coefficient will be hard-thresholded to zero, and the diagonal entry in S is set to 0. Of course, denoising with hard-thresholding requires that S be a function of the utilized transforms in G as well as the input vector x and the utilized threshold. Nevertheless, in order to facilitate analysis description it will be convenient to relax this dependence in portions of the discussion below.

"Contraction" is defined as follows. If G and S are such that for all x $$\|y\|^2 = \frac{1}{M^2} (x^T G^T S \tilde{G}^T)(\tilde{G} S G x) \leq \|x\|^2 \quad (5)$$

then the denoising operation defined by Equation (4) is a contraction. If there exists a set X such that for all $x \in X$, $\|y\|^2 < \|x\|^2$, then the denoising is strictly contracting for $x \in X$.

Unless otherwise specified it is assumed throughout this specification that the utilized transforms are such that the resulting denoising operation is a contraction. Note also that a contraction effectively ensures that signal energy is not increased after denoising, and if the contraction is strictly contracting on some X, then the signal energy is effectively decreased/dissipated for all $x \in X$.

B.1. Layer Recovery by Iterative Denoising

Given an overcomplete set of transforms, the algorithms of the related application proceed to recover layer l in the $k^{th}$ iteration by iterative denoising. Since at each iteration different groups of coefficients can be hard-thresholded to zero, the selection matrix S varies with each iteration. In order to make this dependence specific, let $$D^{l,k} = \frac{1}{M} \tilde{G} S^{l,k} G \quad (6)$$

denote the denoising operation for layer l in iteration k. Let $P_l$(N×N), l=0, ..., L denote the projection to layer l, i.e., $$P_l x = \begin{bmatrix} 0 \\ \vdots \\ 0 \\ x_l \\ 0 \\ \vdots \\ 0 \end{bmatrix} \quad (7)$$

with $P_l P_l = P_l$ and $P_l(1-P_l)=0$, where 1 is the (N×N) identity.

With this notation, the operation of the first iteration over all the layers can be written as $$y_{1,1} = P_1 D^{1,1} x + (1-P_1) x$$

$$y_{2,1} = P_2 D^{2,1} y_{1,1} + (1-P_2) y_{1,1}$$

$$y_{3,1} = P_3 D^{3,1} y_{2,1} + (1-P_3) y_{2,1}$$

$$y_{L,1} = P_L D^{L,1} y_{L-1,1} + (1-P_L) y_{L-1,1}$$

With respect to "layer recovery" let $y_{0,k} = y_{L,k-1}$ for k>1, and let $y_{0,1} = x$. Then the general layer recovery computation at iteration k>1 can be represented as $$y_{l,k} = P_l D^{l,k} y_{l-1,k} + (1-P_l) y_{l-1,k}, \quad 1 \leq l \leq L \quad (8)$$

Observe that at each stage in the iteration the corresponding layer is recovered by denoising the output of the previous stage and projecting the results to the layer. Pixels in other layers are left unchanged. Also, as expected, for $1 \leq l \leq L$ and k>1

$$P_0 y_{l,k} = P_0 P_l D^{l,k} y_{l-1,k} + P_0 (1-P_l) y_{l-1,k} \quad (9)$$

$$= P_0 y_{l-1,k}$$

$$= P_0 x$$

That is, the available data in layer 0 remains unchanged throughout the iterations.

B.2. Derivation of the Present Algorithm

In general, the related application's algorithms analyzed in B.1 above can use a different selection matrix, and hence a different $D^{l,k}$ for each l,k in equation (8). However, as the inventor has discovered, most of the improvements are obtained in the initial iterations, and to achieve good quality results it is not necessary to carry out the full complement of iterations. The simplified iterations presented below show that it is possible to obtain algorithms that are non-iterative in nature. Each such new algorithm obtains the layer pixels directly in one step by solving a set of linear equations.

As demonstrated herein, the main result for the case when the data missing region is decomposed to a single layer. For the more general case of L layers this result is invoked to recover each one of the layers directly, while keeping the other layers fixed, through the equations established below:

With respect to simplified iterations, assume that the data missing region to be recovered is partitioned into a single layer, i.e., let L=1. Suppose that the same selection matrix is utilized by the algorithm at each iteration. Then, $D^{1,k}=D$ for all $k \geq 1$, and the iterations in equation (8) simplify to $$y_{1,k}=P_1 D y_{0,k}+(1-P_1)y_{0,k}=P_1 D y_{1,k-1}+(1-P_1)y_{1,k-1}= (P_1 D+(1-P_1))y_{1,k-1} \quad (10)$$

First consider the convergence properties of the simplified iterations to derive equations yielding the point of convergence directly. Convergence of the simplified iterations in this proposition is established if there exists a y* such that $$y^*=(P_1 D+(1-P_1))y^* \quad (11)$$

and the sequence $\|y_{1,k}-y^*\|$ converges to 0, irrespective of the starting point of the iterations. Using equation (11), the following is obtained:

$$0=P_1(D-1)y^*$$

$$0=P_1(D-1)(P_0+P_1)y^*-P_1(D-1)P_0 x=P_1(D-1)P_1 y^*, \quad (12)$$

where layer 0 remains unchanged, i.e., using equation (9), $P_0 y^*=P_0 x$.

Observe that equation (12) provides $n_1$ equations for the $n_1$ unknowns in $P_1 y^*$. Refer to the set of all y* satisfying equation (12) as the solution set. The iterations leave a vector in the solution set unchanged. To see that convergence will be possible from different starting points let $y_{1,k-1}=y^*+w$, for some w. Using equation (9), $P_0 w=0$, and $$y_{1,k}=(P_1 D+(1-P_1))(y^*+w)=y^*+(P_1 D+(1-P_1))w=y^*+ (P_1 D+P_0)w=y^*+P_1 D w$$

Since D is contracting, so is $P_1 D$ and $\|y_{1,k}-y^*\| \leq \|y_{1,k-1}-y^*\|$, with equality if and only if $w=P_1 D w$ or if w is also in the solution set.

Thus, the simplified iterations defined above converge to a vector satisfying equation (12). Note that this result depends only on D being a contraction and it is thus applicable for more general cases of denoising such as denoising via soft-thresholding.

Since equation (12) provides $n_1$ equations for the $n_1$ unknowns in $P_1 y^*$, it is possible to solve for the layer 1 pixels of the point of convergence, $P_1 y^*$, in terms of the remaining pixels, i.e., the layer 0 pixels in $P_0 x$, by solving equation (12) rather than carrying out iterations. If the null space dimension of the system of linear equations in equation (12) is greater than 0, it is clear that it is not possible to solve for $P_1 y^*$ uniquely. In such a case the portion of $P_1 y^*$ that is orthogonal to the null space through equation (12) can be solved, and the portion of $P_1 y^*$ lying in the null space can be chosen to be the same as the component of the initialization vector (that is set in the initialization step of the algorithms) that lies within the null space.

C. Algorithms

Figure 2:
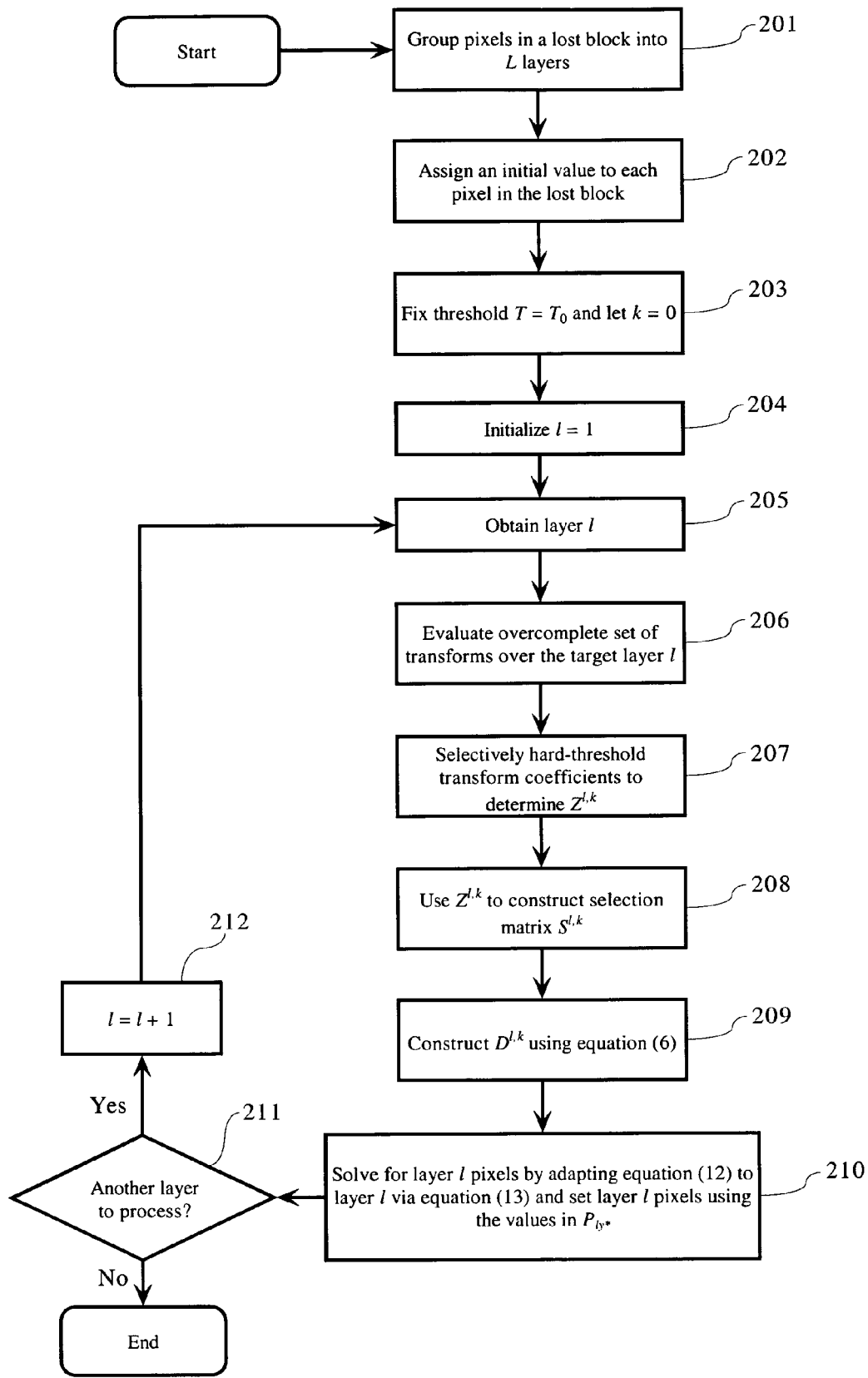
FIG. 2 is a flow chart illustrating the basic process flow of the algorithms of this invention.

Referring to the flow diagram of FIG. 2, the main algorithm starts by grouping the pixels in a lost block into L layers (step 201), as shown in FIG. 1. Layers are recovered in stages with each layer recovered by mainly using the information from the preceding layers, that is, layer 0 is used to recover layer 1, both of which are then used to recover layer 2, and so on. The layer grouping shown in FIG. 1 is exemplary only. Many different groupings are possible, and the one chosen depends on the size and shape of the lost blocks.

Prior to analysis, all layer pixels are initialized, that is, assigned an initial value. This can be done, for example, by computing a mean value from the surrounding pixels of the outer boundary of layer 1 (step 202). Using such a mean value as the initial value is exemplary; alternatively, the initial value may be assigned using another suitable statistical calculation or a fixed constant such as 128 or 0.

In step 203, threshold T is set to $T_0>0$, where $T_0$ may represent, for example, the standard deviation computed from the surroundings of the outer boundary of layer 1. Setting $T_0$ using such a standard deviation is exemplary; alternatively, $T_0$ may be computed using another suitable statistical calculation or set to a fixed constant such as 128 or 256. Let k=0. Set l=1 in step 204.

In step 205 obtain layer l. For the target layer l, evaluate the overcomplete transforms over that layer (step 206). Similar to the main algorithm of the related application, selectively hard-threshold the transform coefficients to determine the set $Z^{l,k}$ of transform coefficients that have absolute values below the threshold T (step 207). Use $Z^{l,k}$ to construct the selection matrix $S^{l,k}$ defined above (step 208). Using equation (6) construct $D^{l,k}$ (step 209). Then, in step 210 solve for layer l pixels by adapting equation (12) to layer l via $$-P_l(D^{l,k}-1)(1-P_l)x=P_l(D^{l,k}-1)P_l y \quad (13)$$

and set layer l pixels using the values in $P_l y^*$. If the null space dimension of the system of equations is greater than 0, then form the solution as set forth in B.2. above.

Steps 205-210 are performed for each layer l=1, . . . , L. Thus, it is determined in step 211 if there are any more layers to process, that is, if l<L. If so, l is incremented by 1 in step 212 and the algorithm returns to step 206. After all layers have been processed, that is, step 211 returns "no," then the program exits the layer processing loop.

Although further iterations are not required, the algorithm may accommodate the ability to perform additional iterations if desired. Thus, if another iteration is desired, after step 211 returns "no" set T=T−dT as described in the related application and set k=k+1. Then go to step 204. If no additional iterations are desired, the algorithm terminates after exiting the layer processing loop.

The success of the algorithms is dependent on layering and the adaptive determination of $Z^{l,k}$ (and hence $S^{l,k}$) via the application of selective hard-thresholding. In what follows the selective hard-thresholding over layers of rectangular shells is discussed. However, other types of layering and adaptive determination are possible for the determination of $Z^{l,k}$ (and hence $S^{l,k}$).

In one alternative embodiment, $S^{l,k}$ may be adaptively determined by examining the relevant characteristics of the image and the characteristics of an area surrounding the region in which data is missing. In another alternative embodiment, $Z^{l,k}$ may be adaptively determined based on the image and an area surrounding the missing data region and $S^{l,k}$ determined therefrom. If $S^{l,k}$ is a binary, diagonal matrix of dimension N×N, then the number of possible $S^{l,k}$ is $2^N$. However, $S^{l,k}$ need not be limited to a diagonal binary matrix; suitable non-binary matrices may also be used. One way to determine a non-binary S would be to multiply selected transform coefficients with a fixed factor other than 0. Arbitrary functions on the coefficients can likewise be obtained by multiplying the coefficients with a coefficient specific factor. Another way is to employ "soft-thresholding," which involves considering each coefficient with respect to a threshold range, say $T_L$ to $T_H$; then, reducing that coefficient by a specific amount if the coefficient is greater than $T_H$, increasing that coefficient by a specific amount if the coefficient is less than $T_L$, and setting that coefficient to zero if the coefficient is with that range. The entries in S can be manipulated to mimic this too.

Figure 3:
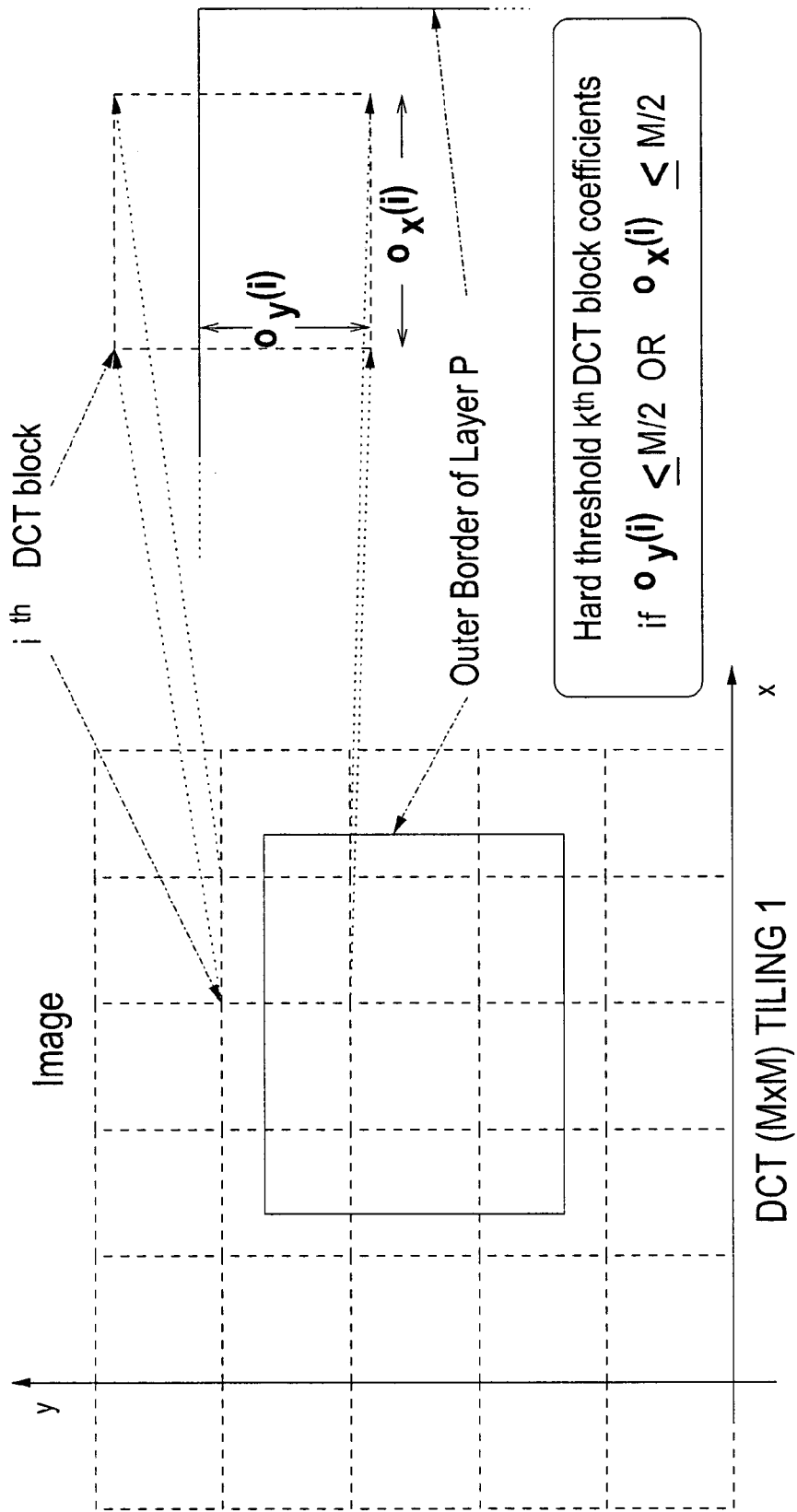
FIG. 3 is a diagrammatic illustration of DCT tiling and selective hard-thresholding, according to embodiments of the invention.
Figure 4:
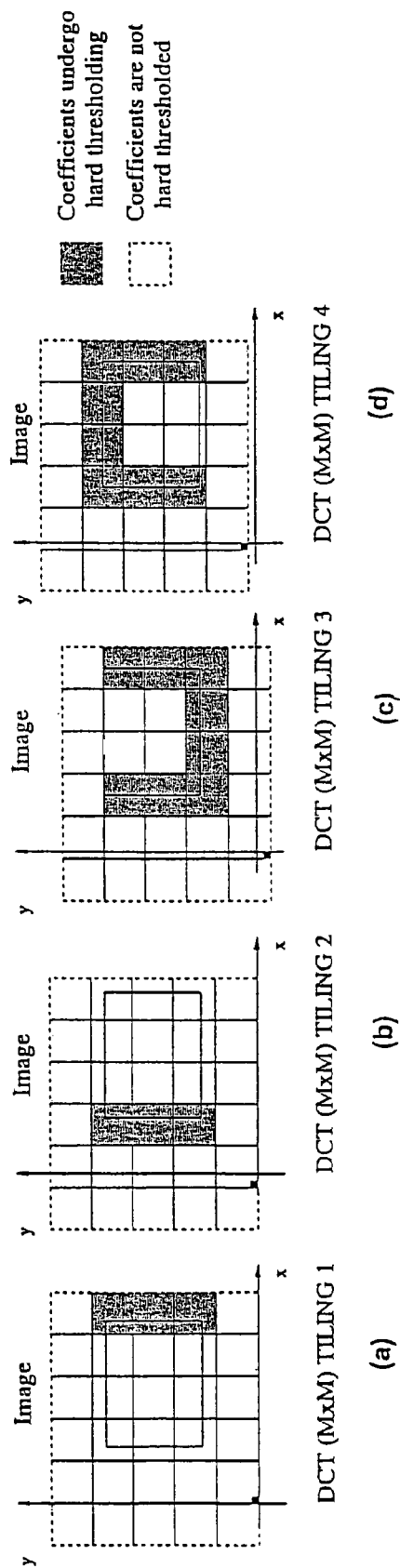
FIGS. 4(a), 4(b), 4(c) and 4(d) are diagrammatic illustrations of DCT tiling and selective hard-thresholding for some other exemplary overcomplete shifts of the M×M DCT.

Regarding the selective hard-thresholding embodiment, fix an initial threshold $T=T_0>0$ (for example, the standard deviation computed from the surroundings of the outer boundary of layer 1) and consider the recovery of layer P using this threshold, i.e., consider the stage of the algorithm where layer P pixels will be recovered using the threshold T while keeping the remaining pixels unchanged. For the sake of simplicity, assume that an M×M DCT and its $M^2-1$ overcomplete shifts will be used in the de-noising operation. In recovering layer P, assume that all pixels in the image that are not in layer P, i.e., all pixels that are in preceding and subsequent layers, have fixed values. Suppose that the initial DCT corresponds to "DCT (M×M) TILING 1" in FIG. 3. Start by evaluating the DCT coefficients. Then for each DCT block determine whether this block overlaps layer P. If there is no overlap, then hard-thresholding of the coefficients of this block is not carried out. If there is overlap, calculate the extent of the overlap with the outer border of layer P in the x and y directions to yield $o_x(i)$ and $o_y(i)$ for the $i^{th}$ DCT block (FIG. 3). If $o_x(i) \leq M/2$ or $o_y(i) \leq M/2$ then the coefficients of the $i^{th}$ DCT block are hard-thresholded. After this selective hard-thresholding, use the indices of the coefficients that have been hard-thresholded to zero to construct part of $Z^{P,k}$. Repeat this operation for the remaining $M^2-1$ overcomplete transforms to completely obtain $Z^{P,k}$ (and hence $S^{P,k}$). FIGS. 4(*a*)-4(*d*) illustrate selective hard-thresholding for some other example overcomplete shifts of the M×M DCT. The final result for layer P is obtained by solving the relevant equations and clipping the layer pixels to the valid pixel value range (0-255 for grayscale images). Of course, not all DCT coefficients need to be evaluated to generate the final result.

Note that it is possible to consider only a subset of the overcomplete shifts and/or utilize different transforms. For other transforms, such as wavelets, wavelet packets, etc., the operation of the algorithm is the same, except that the accounting for the overlap calculations becomes slightly more involved during selective hard-thresholding. Since these transforms have basis functions of varying support for each coefficient (depending on the band), it is prudent to use the support and location of the transform basis function resulting in the particular coefficient during the selective thresholding of that coefficient.

D. Transform Properties

In addition to a sparse image representation by the utilized transform, other characteristics are also desirable for improved operation of the algorithm.

D.1. Performance Over Periodic Features

Consider a locally periodic region surrounding the lost block. The principles articulated here can be straightforwardly extended to the random setting by using cyclostationary processes. In this case, the transform should have sufficient size to deduce the periodicity form the surroundings. Since spatial periodicity by ~R in a given direction implies frequency components separated by ~1/R in the corresponding direction, the utilized transform should have the corresponding frequency selectivity.

D.1. Performance Over Edges

Suppose the lost block is over two constant valued regions separated by a line. In this case, the utilized transformation should have sufficient size to determine the slope of the line and its intersection with the lost block, preferably with directional sensitivity such as that provided by complex wavelets. Note that over constant regions, even very small sized DCTs will provide sparse representations but they will lack the ability to correctly interpolate the separating line. For wavelets and DCTs, the inventor has observed good performance over edge regions, primarily when edges are horizontal, vertical and at ±45° diagonals. Directional sensitivity of complex wavelets and frequency selectivity of large DCTs seem to provide an advantage in other cases.

E. Implementations and Applications

Figure 5:
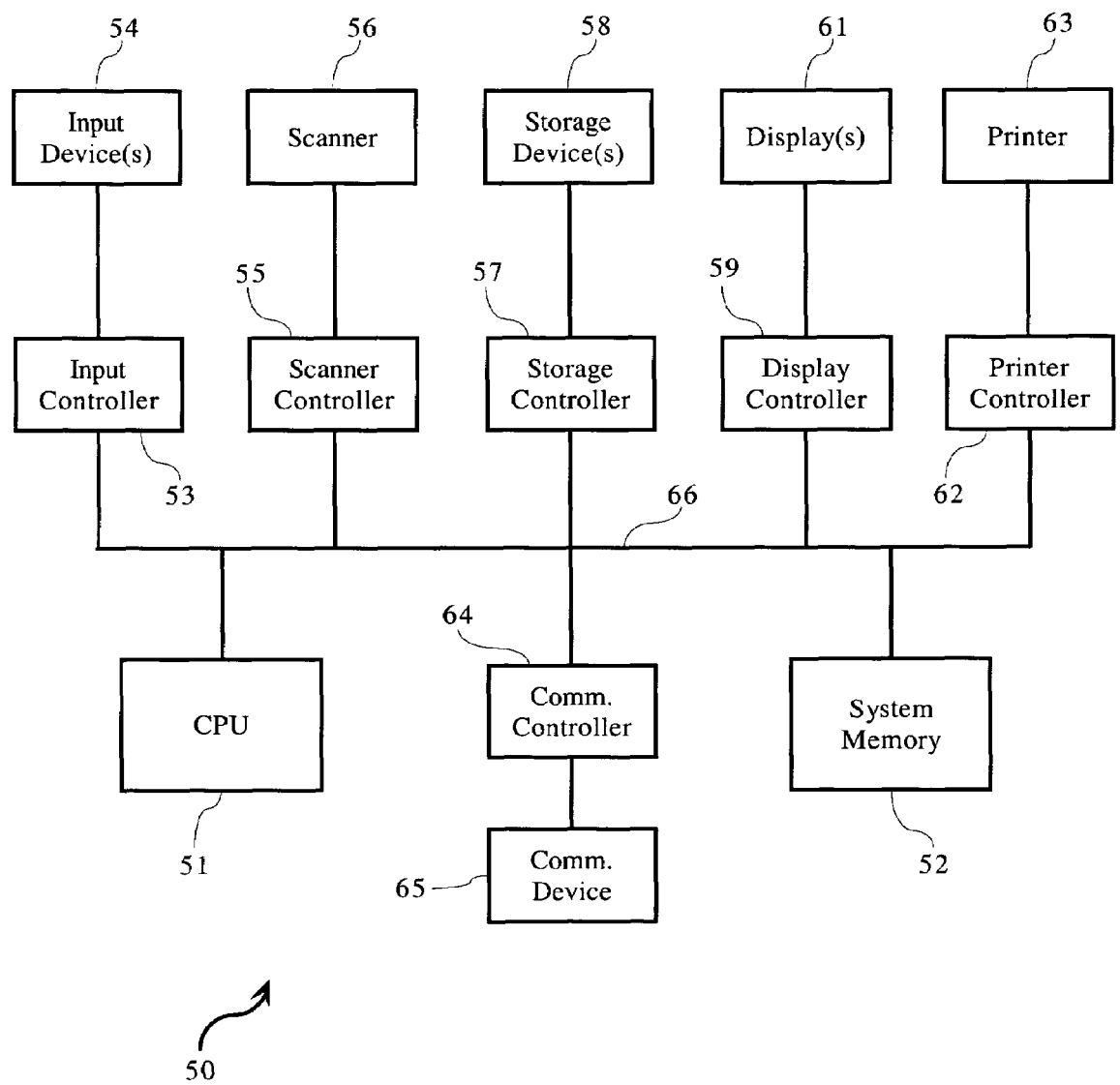
FIG. 5 is a block diagram illustrating an exemplary system which may be used to implement the techniques of the present invention.

FIG. 5 illustrates an exemplary system 50 which may be used to implement the processing of the present invention. As illustrated in FIG. 5, the system includes a central processing unit (CPU) 51 that provides computing resources and controls the computer. CPU 51 may be implemented with a microprocessor or the like, and may also include a graphics processor and/or a floating point coprocessor for mathematical computations. System 50 further includes system memory 52 which may be in the form of random-access memory (RAM) and read-only memory (ROM). Intermediate results obtained during the processing of each layer can be conveniently stored in memory.

A number of controllers and peripheral devices are also provided, as shown in FIG. 5. Input controller 53 represents an interface to various input devices 54, such as a keyboard, mouse or stylus. There is also a controller 55 which communicates with a scanner 56 or equivalent device for digitizing documents including images or representations to be processed in accordance with the invention. A storage controller 57 interfaces with one or more storage devices 58 each of which includes a storage medium such as magnetic tape or disk, or an optical medium that may be used to record programs of instructions for operating systems, utilities and applications which may include embodiments of programs that implement various aspects of the present invention. Storage device(s) 58 may also be used to store processed or data to be processed in accordance with the invention. A display controller 59 provides an interface to a display device 61 which may be a cathode ray tube (CRT) or thin film transistor (TFT) display. A printer controller 62 is also provided for communicating with a printer 63 for printing documents including images or representations processed in accordance with the invention. A communications controller 64 interfaces with one or more communication devices 105 which enables system 50 to connect to remote devices through any of a variety of networks including the Internet, a local area network (LAN), a wide area network (WAN), or through any suitable electromagnetic carrier signals including infrared signals.

In the illustrated system, all major system components connect to bus 66 which may represent more than one physical bus. However, depending on the particular application of the invention, various system components may or may not be in physical proximity to one another. For example, the input data and/or the output data may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical disc, network signals, or any other suitable electromagnetic carrier signals including infrared signals.

While the present invention may be conveniently implemented with software, a hardware implementation or combined hardware/software implementation is also possible. A hardware implementation may be realized, for example, using ASIC(s), digital signal processing circuitry, or the like. As such, the claim language "device-readable medium" includes not only software-carrying media, but also hardware having instructions for performing the required processing hardwired thereon and also hardware/software combination. Similarly, the claim language "program of instructions" includes both software and instructions embedded on hardware. Also, the "component(s)" referred in the claims includes any appropriately configured processing devices, such as instruction-based processors (e.g., CPUs), ASICs, digital processing circuitry, or combination thereof. With these implementation alternatives in mind, it is to be understood that the figures and accompanying description provide the functional information one skilled in the art would require to write program code (i.e., software) or to fabricate circuits (i.e., hardware) to perform the processing required.

As the foregoing demonstrates, the present invention provides software- or hardware-based algorithms/techniques for predicting lost regions of data in an image or video frame based on de-noising using thresholding and linear transforms with sparse image representations. Compared with the related application's algorithms, the algorithms of this invention take a significant short-cut by directly solving for the pixels in each layer via the corresponding equation. Also, in their simplest form, the present algorithms use a single threshold to fully recover the layer pixels, i.e., the reduction of the threshold and further iterations are only desirable if detail information is to be recovered. Hence, the algorithms of this invention form a fast alternative to the related application's algorithms while still achieving most of the benefits thereof.

The algorithms of the present invention have a broad range of applications including error concealment for encoded images and video that have errors during network transmission, recovery of damaged images, scratch removal, etc. The algorithms are directly applicable in cases where temporal prediction is not possible or prudent, for example, in cases involving severely corrupted motion vectors and/or intra-marked macroblocks in the popular MPEG schemes.

The algorithms of the present invention are not specific to lost regions of any particular size, shape or data type and can operate on regions where the data is partially or completely lost. The algorithms can be extended to nonrectangular regions and can also be used for larger regions than 16×16.

Moreover, while application to images and video frames (i.e., 2-D data) is the primary focus of the algorithms, they are not so limited. Rather, the algorithms are readily adaptable to 1-, 3-, 4-D, and even higher dimensional data. For example, the algorithms could be used to fill in missing segments of speech or audio data. The algorithms do not require any special procedures for application. The algorithms can operate on any image, video frame, signal, etc. to predict the missing data therein. How the missing data came to be missing is irrelevant to the operation of the algorithms. For example, the algorithms do not require special measures to be taken or overhead information sent during the encoding stage in an error concealment application.

For image and video frames, the algorithms of the present invention can easily handle cases where the missing data extends over smooth regions, texture regions, high frequency regions, edge regions, periodic regions, and very advantageously over any combination thereof. That is, the missing data does not have to be over "exactly texture" regions, "exactly periodic" regions, etc. If the missing data is over regions that are "approximately texture," "approximately periodic," etc. the algorithms will still work. The same is true for non 2-D data. Thus, the algorithms of the present invention are quite versatile, particularly in comparison with conventional techniques.

In addition to being versatile, the algorithms of this invention are robust. Not only can the algorithms handle various types of data regions, they also do not require input instructions as to what type of region they are operating on. Thus, the algorithms do not employ, nor do they need, a separate step that detects edges, periodic regions, smooth regions, textures, etc. This is also quite advantageous in that the detection of a particular type of region from several others has errors and problems in its own right, and by not employing such a step the algorithms avoid such issues. Instead, the algorithms are adaptive. The algorithms discover what type of region is being operated on and predict the missing data accordingly.

The algorithms of the present invention can be readily extended to cases where the data is in another coordinate system. That is, in addition to their use at predicting missing pixel values, the algorithms can be generalized to predict missing coefficients of various transforms, such as missing DCT, wavelet, or Fourier transform coefficients.

The algorithms of the present invention not only make the visual appearance of each predicted/recovered region consistent with its surroundings, they also produce very low prediction errors. For example, with some conventional techniques, the filled in missing data may be visually acceptable, but an objective measure of performance, such as evaluating the mean-squared-error between the prediction and the original, may yield arbitrarily bad results. The algorithms of the present invention typically result in low mean-squared-error. The algorithms can even recover "anti-aliasing" blur on edges that is present on real world images.

While the invention has been described in conjunction with several specific embodiments, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

What is claimed is:

1. A method for recovering missing data in a digital signal, comprising the steps of:

(a) grouping non-missing data elements in at least one region in which at least some data is missing into n nested layers, where n is an integer greater than or equal to 1;
(b) assigning an initial value to each missing data element in the at least one region; and
(c) for each of the n layers
  (c)(1) evaluating a plurality of orthogonal transforms over layer n,
  (c)(2) thresholding select transform coefficients in layer n using a threshold to determine a set of transform coefficients that have absolute values below the threshold,
  (c)(3) constructing a selection matrix using the set of transform coefficients determined in (c)(2),
  (c)(4) constructing a system of linear equations based on the selection matrix constructed in (c)(3), and
  (c)(5) solving the system of linear equations constructed in (c)(4) to solve for the missing data elements in layer n.

2. The method of claim 1, wherein each of operations (c)(1) through (c)(5) is performed only once per layer.

3. The method of claim 1, wherein the thresholding comprises hard-thresholding.

4. The method of claim 1, wherein the at least one region in which at least some data is missing contains at least one of an edge or a texture feature.

5. The method of claim 1, wherein the plurality of orthogonal transforms comprises (i) a discrete cosine transform and a predetermined number of its overcomplete shifts, (ii) a wavelet transform and a predetermined number of its overcomplete shifts, or (iii) a Fourier transform and a predetermined number of its overcomplete shifts.

6. The method of claim 1, wherein the digital signal is an image or video frame comprised of a plurality of pixels and the at least one region in which at least some data is missing comprises at least some pixels that are missing.

7. The method of claim 6, wherein all of the pixels from the at least one region are missing.

8. A method for recovering missing data in a digital signal representing an image, comprising the steps of:
(a) adaptively determining a selection matrix for each of n nested layers of a region in which at least some data is missing, n being an integer greater than or equal to 1;
(b) constructing a system of linear equations based on each selection matrix; and
(c) solving each constructed system of linear equations to solve for the missing data in the corresponding layer n.

9. The method of claim 8, wherein the selection matrix for each of n layers is adaptively determined based on the image and information in an area surrounding the region in which at least some data is missing.

10. The method of claim 8, wherein the selection matrix for each of n layers is adaptively determined by adaptively determining, based on the image and information in an area surrounding the region in which at least some data is missing, a set of transform coefficients that have absolute values below a threshold, and then determining the corresponding selection matrix therefrom.

11. An apparatus for predicting lost regions in a digital representation, the apparatus comprising one or more components configured to:
group non-missing data elements in at least one region in which at least some data is missing into n nested layers, where n is an integer greater than or equal to 1;
assign an initial value to each missing data element in the at least one region; and
for each of the n layers
  (1) evaluate a plurality of orthogonal transforms over layer n,
  (2) threshold select transform coefficients in layer n using a threshold to determine a set of transform coefficients that have absolute values below the threshold,
  (3) construct a selection matrix using the set of transform coefficients determined in (2),
  (4) construct a system of linear equations based on the selection matrix constructed in (3), and
  (5) solving the system of linear equations constructed in (4) to solve for the missing data elements in layer n.

12. The apparatus of claim 11, wherein each of the operations (1) through (5) is performed only once per layer.

13. The apparatus of claim 11, wherein the threshold operation comprises hard-thresholding.

14. The apparatus of claim 11, wherein the at least one region in which at least some data is missing contains at least one of an edge or a texture feature.

15. The apparatus of claim 11, wherein the plurality of orthogonal transforms comprises (i) a discrete cosine transform and a predetermined number of its overcomplete shifts, (ii) a wavelet transform and a predetermined number of its overcomplete shifts, or (iii) a Fourier transform and a predetermined number of its overcomplete shifts.

16. The apparatus of claim 11, wherein the digital signal is an image or video frame comprised of a plurality of pixels and the at least one region in which at least some data is missing comprises at least some pixels that are missing.

17. The apparatus of claim 16, wherein all of the pixels from the at least one region are missing.

18. An apparatus for predicting lost regions in a digital representation, the apparatus comprising one or more components configured to:
adaptively determine a selection matrix for each of n nested layers of a region in which at least some data is missing, n being an integer greater than or equal to 1;
construct a system of linear equations based on each selection matrix; and
solve each constructed system of linear equations to solve for the missing data in the corresponding layer n.

19. The apparatus of claim 18, wherein the one or more components configured to adaptively determine a selection matrix for each of n layers is configured to adaptively determine each selection matrix based on the image and information in an area surrounding the region in which at least some data is missing.

20. The apparatus of claim 18, wherein the one or more components configured to adaptively determine a selection matrix for each of n layers is configured to adaptively determine, based on the image and information in an area surrounding the region in which at least some data is missing, a set of transform coefficients that have absolute values below a threshold, and then determine the corresponding selection matrix therefrom.

21. A machine-readable medium having a program of instructions for directing a machine to perform a process of predicting lost regions in a digital representation, the program comprising:
(a) instructions for grouping non-missing data elements in at least one region in which at least some data is missing into n nested layers, where n is an integer greater than or equal to 1;

(b) instructions for assigning an initial value to each missing data element in the at least one region; and (c) instructions for performing the following operations on each of the n layers (c)(1) evaluating a plurality of orthogonal transforms over layer n, (c)(2) thresholding select transform coefficients in layer n using a threshold to determine a set of transform coefficients that have absolute values below the threshold, (c)(3) constructing a selection matrix using the set of transform coefficients determined in (c)(2), (c)(4) constructing a system of linear equations based on the selection matrix constructed in (c)(3), and (c)(5) solving the system of linear equations constructed in (c)(4) to solve for the missing data elements in layer n.

22. The machine-readable medium of claim 21, wherein each of the operations (c)(1) through (c)(5) is performed only once per year.

23. The machine-readable medium of claim 21, wherein the instructions for thresholding comprises instructions for hard-thresholding.

24. The machine-readable medium of claim 21, wherein the at least one region in which at least some data is missing contains at least one of an edge or a texture feature.

25. The machine-readable medium of claim 21, wherein the plurality of orthogonal transforms comprises (i) a discrete cosine transform and a predetermined number of its overcomplete shifts, (ii) a wavelet transform and a predetermined number of its overcomplete shifts, or (iii) a Fourier transform and a predetermined number of its overcomplete shifts.

26. The machine-readable medium of claim 21, wherein the digital signal is an image or video frame comprised of a plurality of pixels and the at least one region in which at least some data is missing comprises at least some pixels that are missing.

27. The machine-readable medium of claim 26, wherein all of the pixels from the at least one region are missing.

28. A machine-readable medium having a program of instructions for directing a machine to perform a process of predicting lost regions in a digital representation, the program comprising:

(a) instructions for adaptively determining a selection matrix for each of n nested layers of a region in which at least some data is missing, n being an integer greater than or equal to 1;

(b) instructions for constructing a system of linear equations based on each selection matrix; and (c) instructions for solving each constructed system of linear equations to solve for the missing data in the corresponding layer n.

29. The machine-readable medium of claim 28, wherein the instructions for adaptively determining a selection matrix for each of n layers comprises instructions for adaptively determining each selection matrix based on the image and information in an area surrounding the region in which at least some data is missing.

30. The machine-readable medium of claim 28, wherein the instructions for adaptively determining a selection matrix for each of n layers comprises instructions for adaptively determining, based on the image and information in an area surrounding the region in which at least some data is missing, a set of transform coefficients that have absolute values below a threshold, and then determining the corresponding selection matrix therefrom.

* * * * *